Dec. 18, 1962  KWAN C. TSOU ET AL  3,069,407
METHOD FOR PREPARATION OF CRYSTALLINE POLYSTYRENE
Filed March 31, 1960
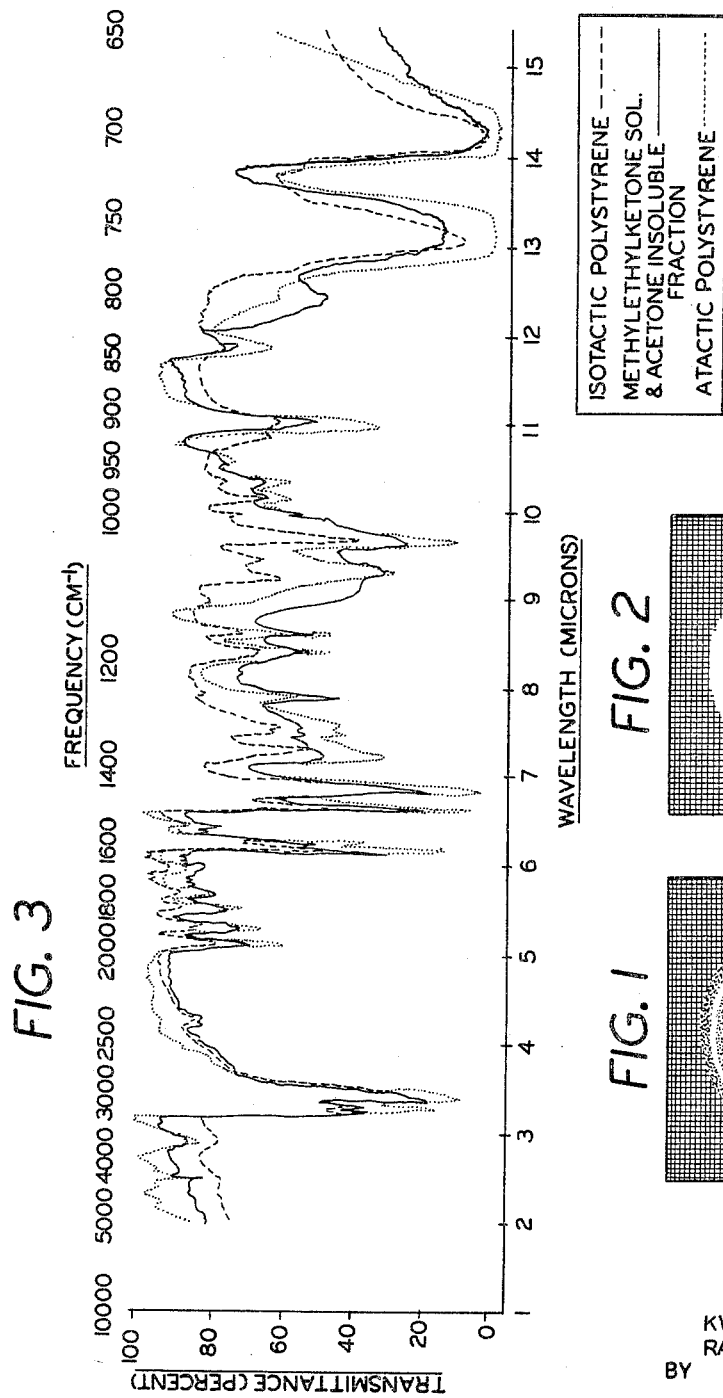
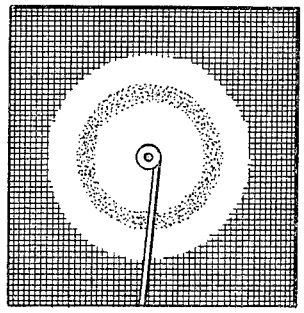
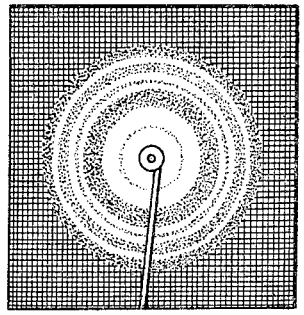
INVENTORS
KWAN CHUNG TSOU
RAY V. MIHAILOVITCH
BY
ROBERT CALVERT
ATTORNEY.

3,069,407
METHOD FOR PREPARATION OF CRYSTALLINE POLYSTYRENE
Kwan C. Tsou, Huntingdon Valley, and Ray V. Mihailovitch, Fairless Hills, Pa., assignors to The Borden Company, New York, N.Y., a corporation of New Jersey
Filed Mar. 31, 1960, Ser. No. 18,898
1 Claim. (Cl. 260—93.5)

This invention relates to a process of making stereoregulated or like polymers of vinyl aromatic hydrocarbons and to a special fraction of the product made by the process. This fraction is insoluble in acetone and soluble in methyl ethyl ketone and has melting point and infrared spectrum different from that of both the atactic and isotactic forms of the polymer.

This invention is particularly useful in making polystyrene and will be illustrated by description in connection therewith.

Polymerization of alpha-olefins using catalysts which consist of organo metallic compounds of metals of groups I–III of the periodic table of the chemical elements and metallic halides of the metals of the transition groups IV—VIII has been described. In the polymerization of the vinyl aromatic hydrocarbons, we have not been able to obtain any appreciable yields of the special fraction which is insoluble in acetone and soluble in methyl ethyl ketone with the catalysts recommended for the olefin polymerization, particularly with the catalysts aluminum triethyl and titanium tetrachloride. We have found satisfactory results, on the other hand, when the catalyst selected is a lithium alkyl and the metal halide is titanium tetrachloride, the process then giving not only an unusually high proportion of polymer other than the low melting atactic species but also giving the isotactic polystyrene (ordinarily insoluble in methyl ethyl ketone), and the new material insoluble in acetone but soluble in methyl ethyl ketone.

This invention comprises the herein described process in which the polymerization of the monomeric vinyl aromatic hydrocarbon is catalyzed by the combination of a lithium alkyl and titanium tetrachloride or by the reaction product of the said alkyl and chloride. The invention comprises also a new type of polystyrene of the solubility characteristics stated above.

In the attached drawing—

FIG. 1 shows the X-ray diffraction pattern of the isotactic polystyrene which is one of the kinds produced from styrene monomer in our process.

FIG. 2 shows the X-ray diffraction pattern of the acetone insoluble and methyl ethyl ketone soluble product which we designate as a new form of amorphous polystyrene.

FIG. 3 shows the infrared absorption spectra of the products that have the X-ray diffraction pattern shown above, for comparison with the amorphous atactic polystyrene.

In general, the process of the invention comprises maintaining the lithium alkyl and titanium tetrachloride catalyst composition in contact with the monomer until it is polymerized. For this reaction, the monomer is suitably used in solution in a liquid that is a non-solvent for the resulting polymer and the catalyst is suspended in finely divided form in the said solution. The reaction is stopped at a predetermined time by the introduction of a material such as alcohol in an amount to inactivate the catalyst.

The material that precipitates will be mixed as a sludge with the polymer resulting from the reaction and any solvent used will ordinarily be largely in a separate phase such as an upper layer.

The solid precipitate is separated from the solvent by filtration. The catalyst is removed from the insoluble polymer by treatment with an acid in quantity to dissolve he inactivated catalyst from the said sludge, the acid as used being usually mixed with the alcohol which is removed by filtration from the polymeric material along with any remaining solvent. The crude polymer is then dried to remove any liquid solvent adhered thereto.

Then the polymer is extracted with acetone, to dissolve therefrom the amorphous atactic polystyrene which will constitute a part of the whole polymer mixture.

The residue after actone extraction is then extracted with methyl ethyl ketone to dissolve out the material of properties illustrated in FIGS. 2 and 3. The residue which is insoluble in both the acetone and methyl ethyl ketone is the isotactic polystyrene which has been made heretofore by Natta (Patent 2,896,264) and others.

The acetone soluble fraction is an amorphous polystyrene of melting point around 105° C., the exact melting point of such polymers varying about 5° up or down with the exact details of preparation and purification.

The methyl ethyl ketone extract is mixed with methanol until precipitation appears to be complete. Then the mass is filtered and the precipitate collected on a filter, washed with more methanol, and dried. The product constituting the residue at this point and which we consider to be new has a melting point of about 170°–180° C. and shows strong absorption bands, at I.R. wave length 7.95 m$\mu$, 9.15 m$\mu$ and 12.5 m$\mu$, which are not present in either the isotactic crystalline polytrene described by Natta et al. or the conventional atactic amorphous polystyrene.

In the extractions and washings referred to above, we continue the washing until substantially no more of the material soluble in the extracting liquid then in use appears in the filtrate from the extraction.

The material insoluble in the methyl ethyl ketone is dried in usual manner to give isotactic polystyrene of melting point above 225° C.

The amorphous and the isotactic polystyrene are useful for purposes that are known for such products. The acetone insoluble and methyl ethyl ketone soluble fraction is useful, as in methyl ethyl ketone solutions, in coating compositions for metals, fabrics or the like and in powder form for making molded plastics by technique usual for polystyrene molding, where the melting point adapts the fraction for molding under conditions which are not entirely satisfactory for either the amorphous or isotactic polystyrene. The two fractions of the polymer other than the amorphous are considered to be stereoregulated. The fraction which is identical to that reported by Natta has been analyzed and found to be isotactic. The exact arrangement in our acetone insoluble and new methyl ethyl ketone soluble fraction is yet to be determined with certainty.

As to materials, the vinyl aromatic hydrocarbon used is ordinarily styrene. Other hydrocarbons containing ethylenic bonds that we may use are the vinyl methyl or ethyl benzenes of which an example is the commercial vinyl toluene. Thus we may use vinyl methyl benzene either ortho, meta, or para. We can also use the vinyl dimethyl benzenes.

The lithium alkyl used is one in which the alkyl group has about 1–8 carbon atoms. While more carbon atoms are permissible, there is no advantage which completely offsets disadvantages in their use. Examples of the lithium alkyls that we use are lithium ethyl, propyl, butyl, octyl, phenyl, ethyl and cyclohexyl, the term alkyl including substituted alkyls of which phenyl ethyl is an example.

An advantage in the use of the lithium phenyl ethyl is the fact that, in the event of any degradation of the lithium alkyl catalyst, the product generated from such degradation would be styrene, $C_6H_5$—$CH$=$CH_2$ which does not introduce any new constituent into the reaction.

The titanium compound used is titanium tetrachloride. We have not found any advantage offsetting the extra cost of using any of the other halides such as titanium fluoride, bromide, or iodide. Also we have not found any reason to substitute any other metal of groups IV–VIII of the said periodic table for titanium.

The solvent used to dissolve the monomer during the contact of the catalyst is one that is a solvent therefor and is inert chemically toward the monomer, the catalyst, and the finished polymer. Examples are the hydrocarbons such as benzene, toluene, pentane, hexane, heptane and cyclohexane.

The material used to inactivate or destroy the catalytic effect when the polymerization is substantially completed is ordinarily methanol. It converts the lithium to the methylate. We can use any $C_1$–$C_8$ alcohol, as, for instance, ethanol, isopropanol, ethylene glycol or the like. The volatile alcohols of boiling point below about 120° C. are preferred because of the convenience of later removal of them from the intermediate product of our process.

Proportions of the several materials in the reaction mixture may be varied in accordance with the exact type of results required from the polymerization. Table 1 shows permissible proportions and also those recommended for commercial operation.

TABLE 1

| Material used | Parts by weight | |
|---|---|---|
| | Permissible | Recommended |
| Vinyl aromatic hydrocarbon | 100 | 100 |
| Solvent for the above | 100–400 | 200–300 |
| Total catalyst (lialkyl plus TiCl₄) | 10–40 | 5–30 |

The catalyst mixture ordinarily contains 1–5 and for best results about 2–3 moles of the lithium alkyl for 1 mole of titanium tetrachloride.

As to conditions of operation, we conduct the polymerization at or below the boiling point of the selected solvent, i.e., under the prevailing pressure, as below about 115° C. and suitably at about 20°–45° C.

The time required for the reaction will vary with other conditions used. Working at 40° C., we have used about 12–24 hours although shorter times such as 7 hours may be permissible, particularly with the larger proportions of catalyst.

We find it satisfactory to introduce first the catalyst mixture into the solvent. Action occurs almost instantaneously between the lithium alkyl and the titanium tetrachloride as shown by evolution of some heat and also darkening of the mass. The monomer to be polymerized is then added dropwise.

When the reaction between the catalyst components no longer evolves substantial heat, we admix the monomer either so slowly as to avoid excessive exotherm or with cooling so as to maintain the temperature within the ranges shown.

Representative results of our process appear in Table 2. The monomer used was styrene. The table shows the percentage of the total polymer that occurs as the forms which are (1) soluble in acetone, (2) soluble in ethyl methyl ketone, and (3) soluble in neither, i.e., insoluble in both acetone and methyl ethyl ketone. The total catalyst component used, in obtaining the data in the table, is expressed as parts by volume for 100 volumes of styrene.

TABLE 2

| Moles of LiBu for 1 mole TiCl₄ | Percent of polymer product soluble in— | | |
|---|---|---|---|
| | Acetone | Methyl ethyl ketone | Neither |
| 3.5 | 80.7 | 13.7 | 5.6 |
| 2.7 | 12.5 | 6.3 | 81.2 |
| 2.1 | 52.4 | 24.8 | 12.8 |
| 1.75 | 86.2 | 3.0 | 10.8 |
| 0.70 | 77.9 | 0 | 0 |

The melting point of the three fractions of the product made with the 2.1:1 ratio of LiBu to TiCl₄ were 105°, 185° and 210° C., respectively, plus or minus 5°.

The proportion of the stereoregulated polystyrene, as high as 87.5% (6.3+81.2) with the 2.7 moles compares favorably with reports by other workers in the field (LaChimica e Industria 40, No. 6,445, 1958 and said patent).

The invention will be further illustrated by description in connection with the following specific examples. In these examples and elsewhere herein proportions are expressed as parts by weight unless specifically stated to the contrary.

*Example 1*

To a mixture of 200 ml. of heptane as solvent and 5.5 ml. TiCl₄ there were added dropwise 80 ml. of 16% n-butyl lithium solution. A temperature rise was observed during the addition due to the exothermic nature of the reaction between the catalyst components. When the reaction mixture acquired a pitch-dark color, the reduction of TiCl₄ to TiCl₃ was completed. Styrene (100 ml.) was then admixed.

At the predetermined time (usually after 20 hours) the polymerization reaction, which was carried out at 40° C., was stopped by an addition of methanol which at the same time also deactivates the catalyst complex.

The bulk polymer was then washed with methanol and 10% hydrogen chloride in methanol, extracted with acetone and methyl ethyl ketone (MEK), to separate different polymer fractions, and finally dried under vacuum at 80° C.

The relative amounts of three distinct polymer fractions were as follows:

|  | Percent |
|---|---|
| MEK soluble fraction | 52.5 |
| Isotactic fraction | 22.2 |
| Acetone soluble fraction | 25.3 |

*Example 2*

Titanium tetrachloride and 16% n-butyl lithium solution in the amounts shown in Example 1 were added in that order to 150 ml. of solvent (heptane) until a Li/Ti molar ratio of 2.7:1 was obtained. The polymerization reaction was started by a dropwise addition of styrene (100 ml.) and carried out at 0° C. for 18 hours.

The bulk polymer so produced was treated in the same manner as described in Example 1. This polymer consisted of the following fractions:

| | Percent |
|---|---|
| MEK soluble fraction | 6.3 |
| Isotactic fraction | 81.3 |
| Acetone soluble fraction | 12.4 |

*Example 3*

Using the same concentrations of the reagents as in Example 2 but carrying out the polymerization reaction at 25° C. for 18 hours, we have obtained a polymer consisting of the following fractions:

| | Percent |
|---|---|
| MEK soluble fraction | 16.4 |
| Isotactic fraction | 54.2 |
| Acetone soluble fraction | 29.4 |

*Example 4*

Applying the same materials and proportions as given in Example 1, we have conducted the polymerization reaction at 70° C. for 18 hours.

The resulting polymer contained only two fractions, i.e., the MEK soluble fraction (94.2%) and the acetone soluble fraction (5.8%). No isotactic fraction was separable by extraction.

*Example 5*

The procedure, compositions, and conditions of Examples 1–4 are used except that we replace the lithium butyl by an equimolar proportion of any of the other lithium alkyls disclosed herein.

It will be understood that it is intended to cover all changes and modifications of the examples of the invention herein chosen for the purpose of illustration which do not constitute departures from the spirit and scope of the invention.

We claim:

In making a stereoregulated polymer, the process which comprises maintaining styrene in solution in a volatile liquid hydrocarbon solvent therefor and in contact with a polymerization catalyst suspended in the said solution until the ensuing exothermic reaction is substantially completed and then separating the resulting polymer from the solvent, the catalyst being the product of interaction of lithium phenyl ethyl with titanium tetrachloride in the proportion of about 1–5 moles of the lithium phenyl ethyl to 1 mole of the tetrachloride.

References Cited in the file of this patent

UNITED STATES PATENTS

| 2,954,367 | Vandenberg | Sept. 27, 1960 |

FOREIGN PATENTS

| 549,570 | Belgium | Aug. 14, 1956 |

OTHER REFERENCES

Ang: Journal of Polymer Science, volume 25, pages 126–8 (1957).

Danusso et al.: Journal of Polymer Science, volume 24, pages 161–172 (1957).

Natta: Die Makromolekulare Chemie, volume 16, pages 213–237 (1955).